(No Model.)
S. D. TOMLINSON.
TIRE TIGHTENER.
No. 376,491. Patented Jan. 17, 1888.
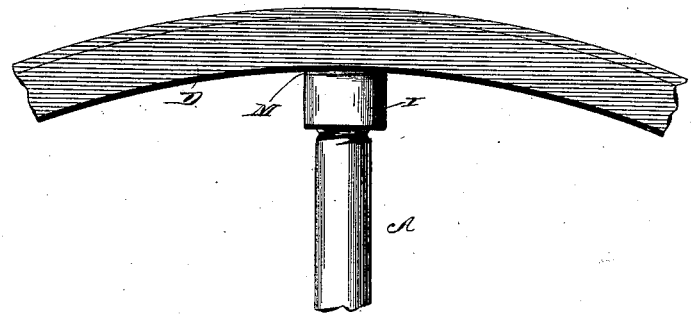
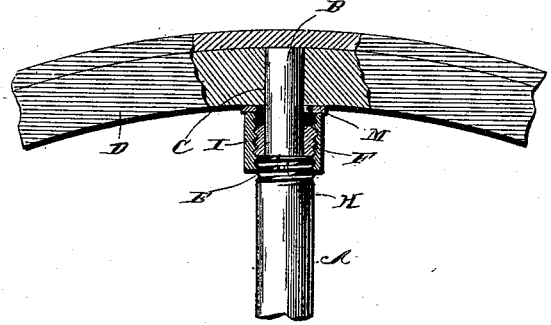
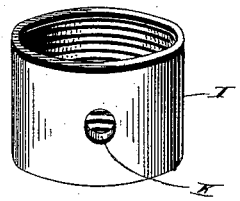
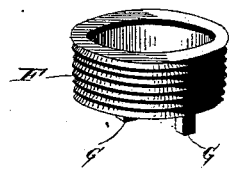
Witnesses
Inventor
S. D. Tomlinson
by C. A. Snow & Co
Attorneys

UNITED STATES PATENT OFFICE.

STEPHEN DUMAS TOMLINSON, OF GLADESVILLE, GEORGIA.

TIRE-TIGHTENER.

SPECIFICATION forming part of Letters Patent No. 376,491, dated January 17, 1888.

Application filed September 2, 1887. Serial No. 248,609. (No model.)

*To all whom it may concern:*

Be it known that I, STEPHEN DUMAS TOMLINSON, a citizen of the United States, residing at Gladesville, in the county of Jasper and State of Georgia, have invented a new and useful Improvement in Tire-Tighteners, of which the following is a specification.

My invention relates to an improvement in tire-tighteners for vehicle-wheels; and it consists in the peculiar construction and combination of devices, that will be more fully set forth hereinafter, and particularly pointed out in the claim.

In the accompanying drawings, Figure 1 is an elevation of a portion of a wheel provided with my improved tire-tightening device. Fig. 2 is a vertical sectional view of the same. Fig. 3 is a detached perspective view of the sleeve. Fig. 4 is a similar view of the collar.

A represents a spoke, which is provided at its outer end with a tenon, B, adapted to fit in an opening or mortise, C, in the felly D. The shoulder of the spoke formed at the inner end of the tenon is screw-threaded, as at E.

F represents a circular collar, which is preferably made of iron or steel, and fits snugly on the inner end of the tenon. The under side of this collar is provided at diametrically-opposite points with depending studs G, which fit in the notches H in the shoulder at the outer end of the spoke, and thereby prevent the collar from turning on the tenon.

I represents a cylindrical sleeve, which is provided with interior screw-threads which fit corresponding threads on the outer side of the collar, and also engage the threads E on the end of the spoke. This sleeve is provided on opposite sides with openings K, adapted to be engaged by a key or handle, whereby the sleeve may be turned. A washer, M, fits on the tenon and bears between the outer end of the sleeve and the inner side of the felly.

Each spoke of the wheel will be provided with a collar, sleeve, and washer such as described.

The operation of my invention is as follows: In order to tighten the tire when it becomes loose, the sleeves on the spokes are turned in one direction, so as to move them outward on the screw-threads of the collar toward the felly-sections, and thereby force the said felly-sections outward, and consequently increase the diameter of the wheel sufficiently to cause the fellies to bind tightly against the inner side of the tire.

It frequently happens that in wet weather the wooden spokes of a wheel expand to such an extent as to cause the tire to compress the felly too tightly. When this is the case, the sleeves on the spokes must be turned, so as to cause them to move inward a slight distance toward the hub of the wheel, and thereby relieve the compression of the tire on the felly. The washer M between the sleeves and the fellies prevents the latter from being worn by the rotation of the collars when the latter are being adjusted.

A tire-tightener thus constructed is cheap and simple, is readily applied to existing forms of wheels, and will be found of great practical utility.

The metal collar F has necessarily a diameter equal to that of the end of the spoke, and both necessarily have equal and similar threads. The end of the spoke being of wood, its threads are too weak to alone engage and hold to the sleeve I. It is therefore supplemented by the metal sleeve F, which is practically a continuation of the spoke, and is held tightly thereon when the parts are together.

When the tire is in place, the ends of the tenons can be made to abut against its inner surface, so that it will receive the direct thrust therefrom.

Having thus described my invention, I claim—

The combination of the spokes, each having the end tenon, C, the threaded portion E, and the notches H in the shoulder formed by the tenon, and the externally-threaded sleeves F, each having a diameter equal to that of the end of the corresponding spoke, and provided with the studs D and with threads similar to those of the spokes, with the fellies having the mortises extending through them, the tire with the tenons abutting against its inner surface, the metal washers M, and the metal sleeves I, internally threaded and engaging the threads of the sleeves F and of tapped parts E of the spokes, substantially as specified.

In testimony that I claim the foregoing as my own I have hereto affixed my signature in presence of two witnesses.

STEPHEN DUMAS TOMLINSON.

Witnesses:
STEPHEN C. LAWRENCE,
ELI B. MCKINLEY.